(12) United States Patent
Fulayter et al.

(10) Patent No.: US 8,500,399 B2
(45) Date of Patent: Aug. 6, 2013

(54) METHOD AND APPARATUS FOR ENHANCING COMPRESSOR PERFORMANCE

(75) Inventors: Roy Fulayter, Avon, IN (US); Steve Wellborn, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1776 days.

(21) Appl. No.: 11/789,688

(22) Filed: Apr. 25, 2007

(65) Prior Publication Data

US 2012/0014776 A1 Jan. 19, 2012

Related U.S. Application Data

(60) Provisional application No. 60/794,739, filed on Apr. 25, 2006.

(51) Int. Cl.
*F01D 9/02* (2006.01)
(52) U.S. Cl.
USPC ................... 415/182.1; 415/196; 415/914

(58) Field of Classification Search
USPC .............. 415/126, 128, 148, 182.1, 196, 197, 415/211.2, 220, 232, 914
See application file for complete search history.

(56) References Cited

U.S. PATENT DOCUMENTS

| | | | |
|---|---|---|---|
| 2,735,612 A | | 2/1956 | Hausmann |
| 3,750,397 A | * | 8/1973 | Cohen et al. .................... 60/804 |
| 4,318,669 A | | 3/1982 | Wennerstrom |
| 4,512,158 A | | 4/1985 | Striebel et al. |
| 4,718,819 A | * | 1/1988 | Rogo et al. ................. 415/149.1 |
| 4,971,768 A | | 11/1990 | Ealba et al. |
| 5,110,560 A | | 5/1992 | Presz, Jr. et al. |
| 5,335,501 A | | 8/1994 | Taylor |
| 5,397,215 A | | 3/1995 | Spear et al. |
| 6,195,983 B1 | * | 3/2001 | Wadia et al. ................. 60/226.1 |
| 6,513,330 B1 | | 2/2003 | Rice et al. |
| 6,561,761 B1 | * | 5/2003 | Decker et al. .............. 415/173.1 |
| 6,564,555 B2 | | 5/2003 | Rice et al. |
| 7,181,914 B2 | | 2/2007 | Pidcock et al. |
| 2002/0159886 A1 | * | 10/2002 | Hiyama et al. ................ 415/207 |

* cited by examiner

*Primary Examiner* — Dwayne J White
(74) *Attorney, Agent, or Firm* — Krieg DeVault LLP

(57) ABSTRACT

The present invention provides a non-axisymmetric flow member disposed in a duct of a gas turbine engine. The flow member narrows the area aft of a vane to reduce the cross sectional area through which a wake from the vane traverses.

19 Claims, 9 Drawing Sheets

METHOD AND APPARATUS FOR ENHANCING COMPRESSOR PERFORMANCE

CROSS-REFERENCE TO RELATED APPLICATIONS

The present application claims the benefit of U.S. Provisional Patent Application No. 60/794,739 filed Apr. 25, 2006, which is incorporated herein by reference.

BACKGROUND

The present application generally relates to flow restrictors and more particularly, but not exclusively, to flow restrictors applied to flow paths of gas turbine engines.

Structures embedded within flow sections of gas turbine engines may generate wakes of various proportions that traverse through ducts downstream of the structures. These wakes, furthermore, may adversely impact gas turbine engine integrity and performance. Presently, many flow path designs have a variety of shortcomings, drawbacks and disadvantages. Accordingly, there is a need for further contributions in this area of technology.

SUMMARY

One embodiment of the present application is a unique non-axisymmetric flow member for a gas turbine engine. Other embodiments include unique apparatuses, systems, devices, hardware, methods, and combinations of these non-axisymmetric flow members in gas turbine engines. Further embodiments, forms, objects, features, advantages, aspects, and benefits of the present invention shall become apparent from the following description and drawings.

DETAILED DESCRIPTION

Figure 1:
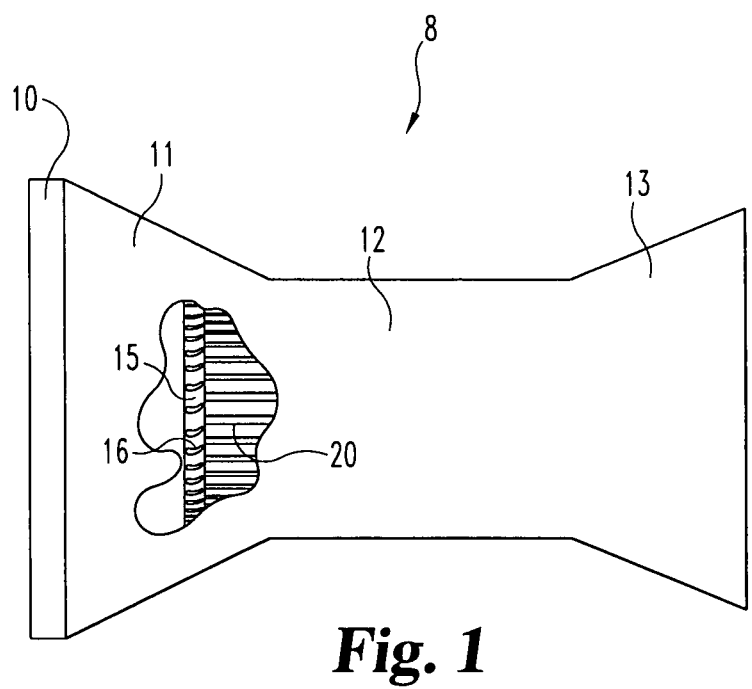
FIG. 1 is a schematic representation of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to with the invention relates.

The present inventions were developed for application in the field of turbo machinery, including but not limited to, gas turbine engines. While the present invention is broadly applicable to gas turbine engines, it has specific, but is not limited to, application in gas turbine engines utilized in aircraft. It is understood that the term aircraft is generic and includes, but is not limited to, helicopters, tactile fighters, trainers, unmanned vehicles, space reentry vehicles and other types of related apparatus. Historically, there has also been application of gas turbine engines as industrial gas turbine engines, electricity generation, naval propulsion and land vehicles.

With reference to FIG. 1, there is illustrated one non-limiting embodiment of a gas turbine engine 8. The gas turbine engine 8 in FIG. 1 is illustrative and there is no intention to limit the types and/or configurations of gas turbine engines contemplated herein unless specifically provided to the contrary. Gas turbine engine 8 includes a fan 10, compressor 11, combustor 12 and a turbine 13. It is important to realize that are multitudes of ways in which the components of the gas turbine engine can be linked together. Additional compressors could be added with an inter-cooler connecting between the compressors, and reheat combustion chambers could be added between the turbines. Further, in one other embodiment the gas turbine engine does not include a fan stage.

The gas turbine engine 8 includes at least one rotatable bladed rotor 15 for interacting with a working fluid. The bladed rotor 15 includes a disk/wheel that carries a plurality of blades 16. As the flow passes from the compressor it flows through a plurality of outlet guide vanes 20. The compressor may have one or a plurality of stages and in one embodiment has a plurality of stages. The compressor may be of an axial or centrifugal configuration.

Figure 2:
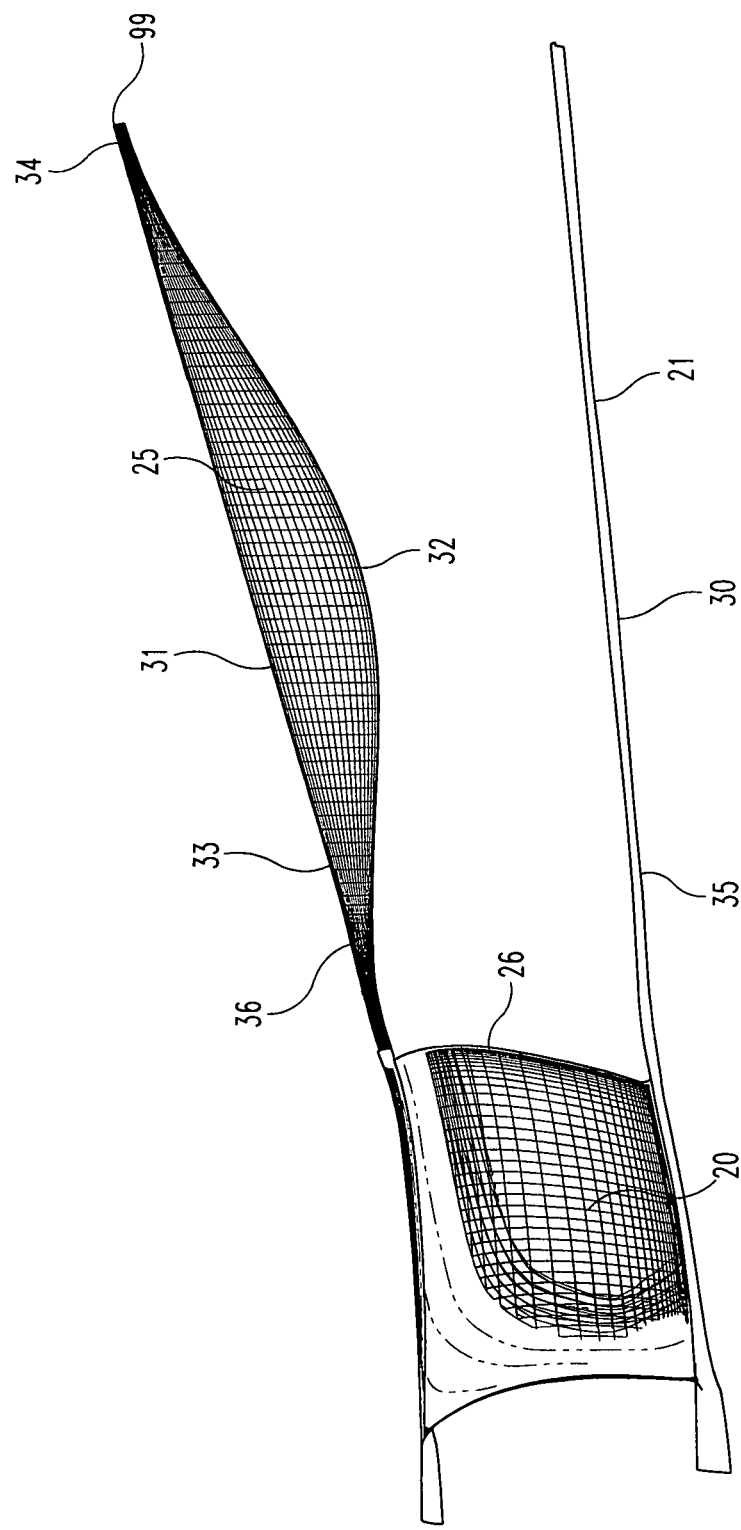
FIG. 2 is a side view of a duct.
Figure 3:
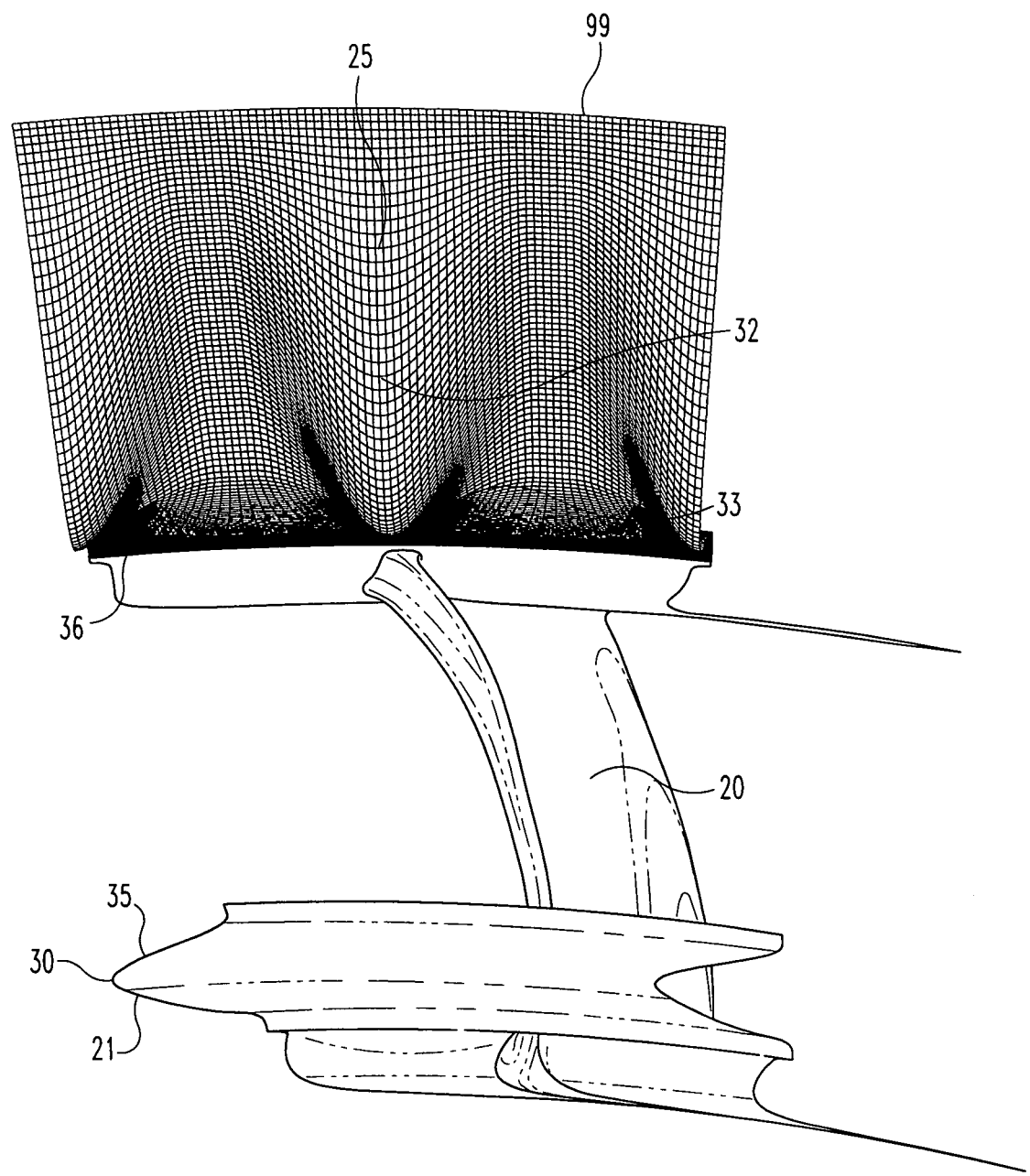
FIG. 3 is a rear view of duct.
Figure 4:
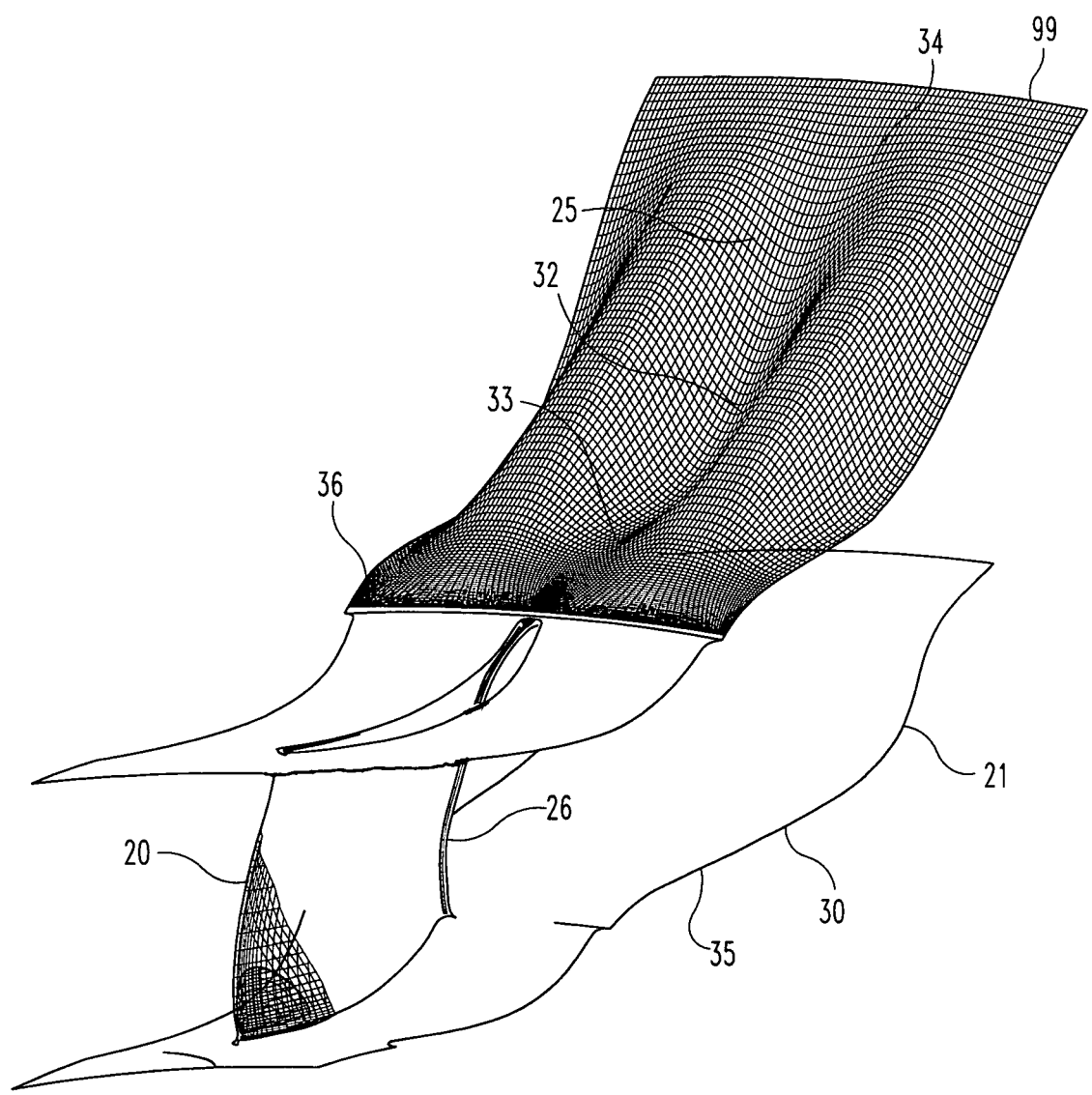
FIG. 4 is a perspective view of a duct.

With reference to FIGS. 2, 3, and 4, there is illustrated the fluid flow path thru outlet guide vanes 20 of the compressor 11. In one form the plurality of outlet guide vanes 20 define a guide vane stage. In the embodiment illustrated in FIGS. 2, 3, and 4, the working fluid flows through a duct or diffuser 21 defined by inner wall member 35 and outer wall member 36. Inner wall member 35 has an inner wall diffusion; likewise, outer wall member 36 has an outer wall diffusion. Depending upon geometry and relative flow conditions, the inner wall diffusion may be higher than the outer wall diffusion. In one form the present application includes a non-axisymmetric flow member 25 disposed adjacent to at least one of the walls defining the duct or diffuser 21. In some implementations, the non-axisymmetric flow member 25 may be disposed in the wall having the higher rate of diffusion. The present application contemplates that the non-axisymmetric flow member 25 could be located at the hub portion 30, tip portion 31 or both portions of the duct or diffuser 21. In one form the non-axisymmetric flow member 25 is located downstream of the trailing edge 26 of vane 20. In one form the duct or diffuser 21 is an annular flow path with a plurality of circumferentially distributed vanes 20 located upstream thereof. Disposed downstream of each of the trailing edges 26 is one of the non-axisymmetric flow members 25.

The non-axisymmetric flow members 25 are located downstream of the outlet guide vanes 20 and may or may not extend to the diffuser exit or downstream in an S-shaped duct. Non-axisymmetric flow members 25 may be protrusions into the fluid flow path or may act as restrictors to the flow. In one form the non-axisymmetric members 25 extend up to about 30% of the distance between inner wall member 35 and outer wall member 36, and in another form extends about 30% of the distance between inner wall member 35 and outer wall member 36. However, the flow members 25 may extend other distances between the inner wall member 35 and the outer wall member 36. The application of a plurality of non-axisymmetric flow members 25 causes a localized reduction in the cross-sectional fluid flow area. The non-axisymmetric flow members 25 may be elongate and have a variety of shapes such as, but not limited to tapered, tear drop, and rectangular. In another form contemplated herein, the flow members may have other geometries including but not limited to symmetric, square, circular, non-elongate. In one form the flow members 25 are defined by elongate restrictors which may have a length to width ratio of 3:1. In another form the non-axisymmetric flow member 25 has a peak bump distance 32 located between the leading end 33 and the trailing end 34. In another embodiment the peak bump distance 32 may be located proximate duct end 99. However the present application contemplates a broad variety of configurations for the peak bump distance location. In some embodiments the non-axisymmetric flow members 25 have a width that extends up to 90% of half pitch. In other embodiments, the non-axisymmetric flow member 25 have a sinusoidal profile when viewed from the front or back.

The non-axisymmetric flow members 25 may be oriented parallel to the fluid flow or at an angle to cause swirl in the fluid flow. In one form the non-axisymmetric flow members 25 leading edge is disposed adjacent to the outlet guide vane and in another embodiment the non-axisymmetric flow members 25 leading edge is spaced from the outlet guide vane. In another embodiment each of the non-axisymmetric flow members 25 are attached to one of the outlet guide vanes. In still another embodiment the non-axisymmetric flow members 25 may extend upstream past the trailing edge of the outlet guide vane towards the leading edge.

The present application contemplates that the non-axisymmetric flow members 25 may be fixed structures or may be a structures actuated to extend into or retract from the flow path. In one embodiment, the non-axisymmetric flow members 25 that are fixed structures are utilizable as passive fluid flow control devices. In the embodiment where the non-axisymmetric flow members 25 are actuated there can be tailoring to match the flow conditions. In one form, non-axisymmetric flow members 25 take the shape of a plate that can be selectively placed in the fluid flowpath. In other forms, non-axisymmetric flow members 25 may be actuated via pneumatic or thermal devices or may take the form of a metallic bladder. For example, the non-axisymmetric flow members 25 may be partially extended into the flow path or may be cycled at varying frequencies or rapidly actuated to fixed positions depending on conditions in the flow path. The command signals that drive the actuators may be determined by a computer, such as a FADEC, or other similar device. Various types of actuation systems may be used such as linear actuators and rotary actuators to state just a few nonlimiting examples. The utilization of the actuated non-axisymmetric flow members 25 would allow for the controlling of the diffusion rate in the duct or diffuser.

In one form the non-axisymmetric flow members 25 creates blockage for the outlet guide vane wake fluid that accelerates the wake fluid locally. In another form the flow members 25 creates blockage that keeps the wake fluid from diffusing along with the core working fluid flow. The flow members 25 function to keep the duct or diffuser 21 and/or S-ducts attached since it is the wake fluid that generally causes the flow to separate in diffusing flow.

In fluid flow in ducts or diffuser 21, the non-axisymmetric flow members 25 keep the wake fluid momentum raised in comparison to an axisymmetric duct or diffuser and the wake fluid flow is less likely to separate. The fluid flow in the duct or diffuser with the plurality of non-axisymmetric flow member 25 stays attached longer than the fluid flow in an axisymmetric duct or diffuser. The non-axisymmetric fluid flow members 25 generate a blockage in the flow region where the outlet guide vane wake fluid would normally occupy in an axisymmetric duct or diffuser. The blockage associated with the non-axisymmetric flow members 25 prevents the wake fluid from diffusing at the same rate as the core working fluid flow.

Figure 5:
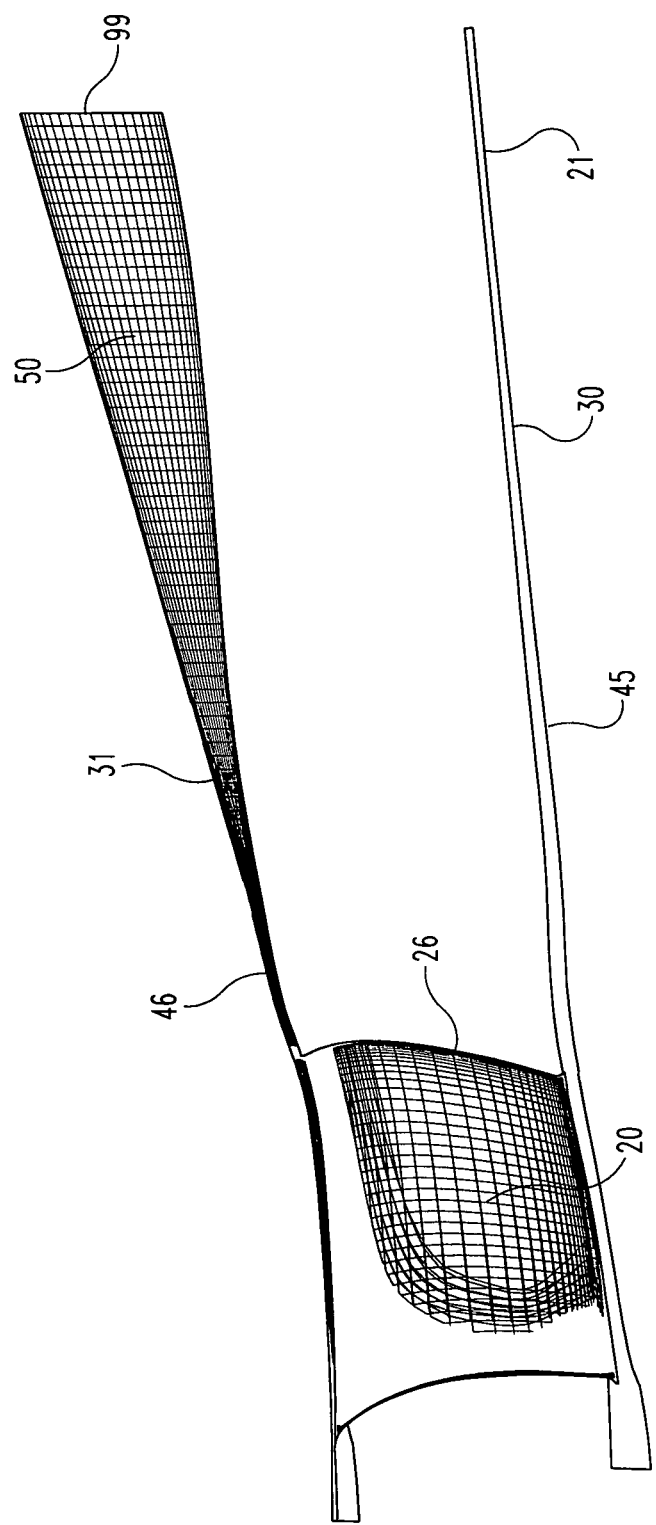
FIG. 5 is a side view of a duct.
Figure 6:
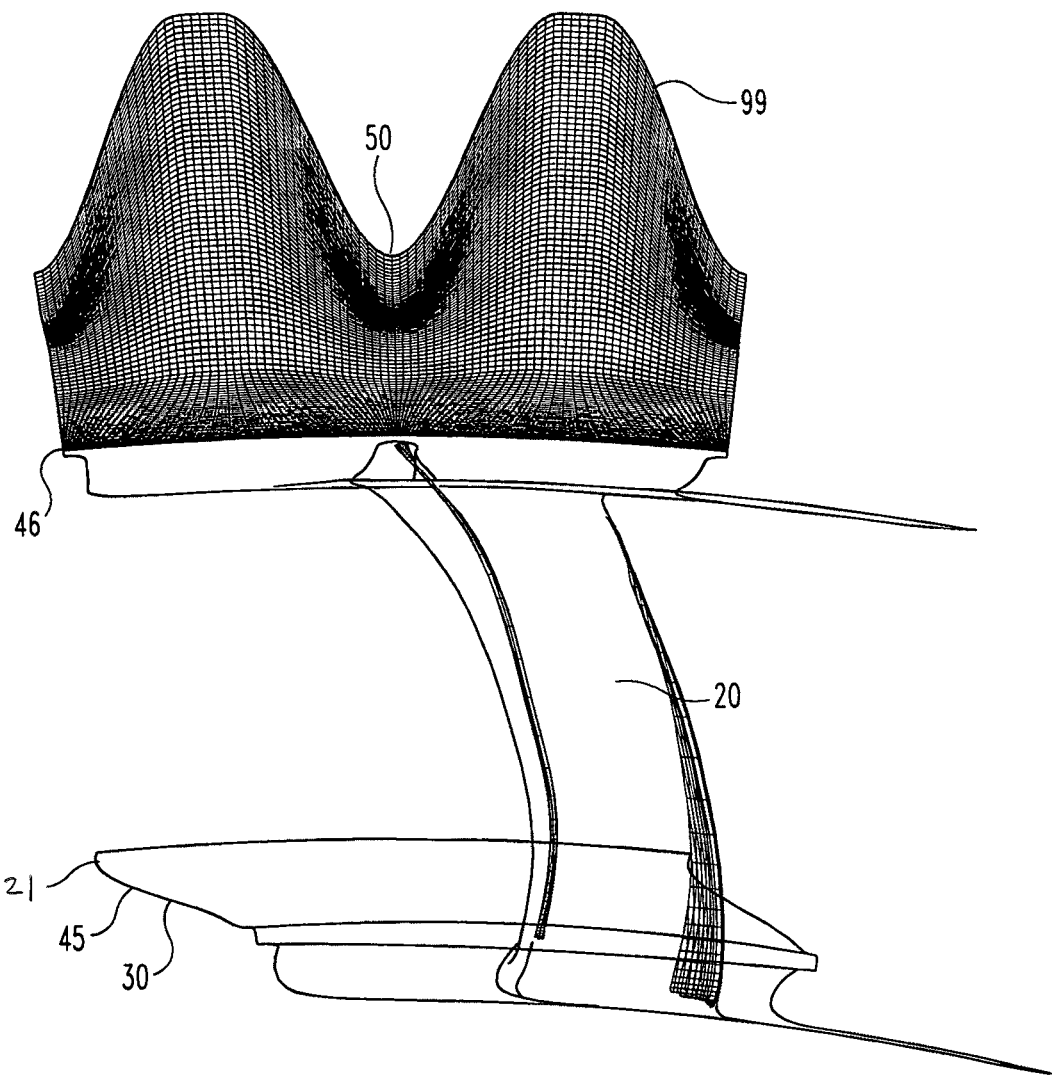
FIG. 6 is a rear view of duct.
Figure 7:
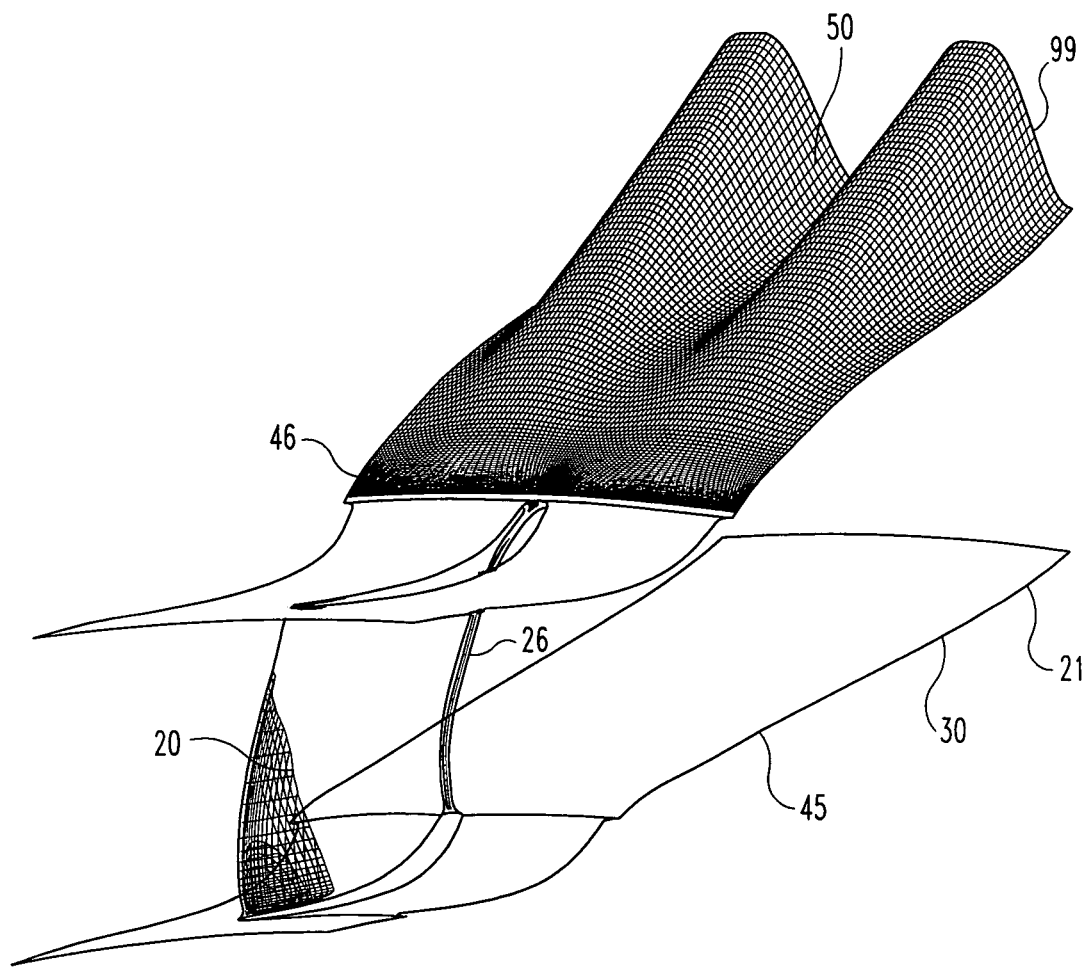
FIG. 7 is a perspective view of a duct.

Turning now to FIGS. 5, 6, and 7, there is illustrated a diffuser having non-axisymmetric flow members 50 disposed towards duct end 99 to provide a duct having a lobed appearance. The flow members 50 are substantially identical to the flow members 25. The working fluid flows through a duct or diffuser 21 defined by inner wall member 45 and outer wall member 46. Inner wall member 45 has an inner wall diffusion; likewise, outer wall member 46 has an outer wall diffusion. Depending upon geometry and relative flow conditions, the inner wall diffusion may be higher than the outer wall diffusion. The present application includes a non-axisymmetric flow member 50 disposed adjacent to at least one of the walls defining the duct or diffuser 21. In some implementations, the non-axisymmetric flow member 50 may be disposed in the wall having the higher rate of diffusion. The present application contemplates that the non-axisymmetric flow member 50 could be located at the hub portion 30, tip portion 31 or both portions of the duct or diffuser 21. In one form the non-axisymmetric flow member 50 is located downstream of the trailing edge 26 of vane 20. In one form the duct or diffuser 21 is an annular flow path with a plurality of circumferentially distributed vanes 20 located upstream thereof. Disposed downstream of each of the trailing edges 26 is one of the non-axisymmetric flow members 50. In the embodiment illustrated in FIGS. 5, 6, and 7 the non-axisymmetric flow members 50 have a sinusoidal cross-sectional shape and extend downstream to create a lobed appearance in duct end 99.

Figure 8:
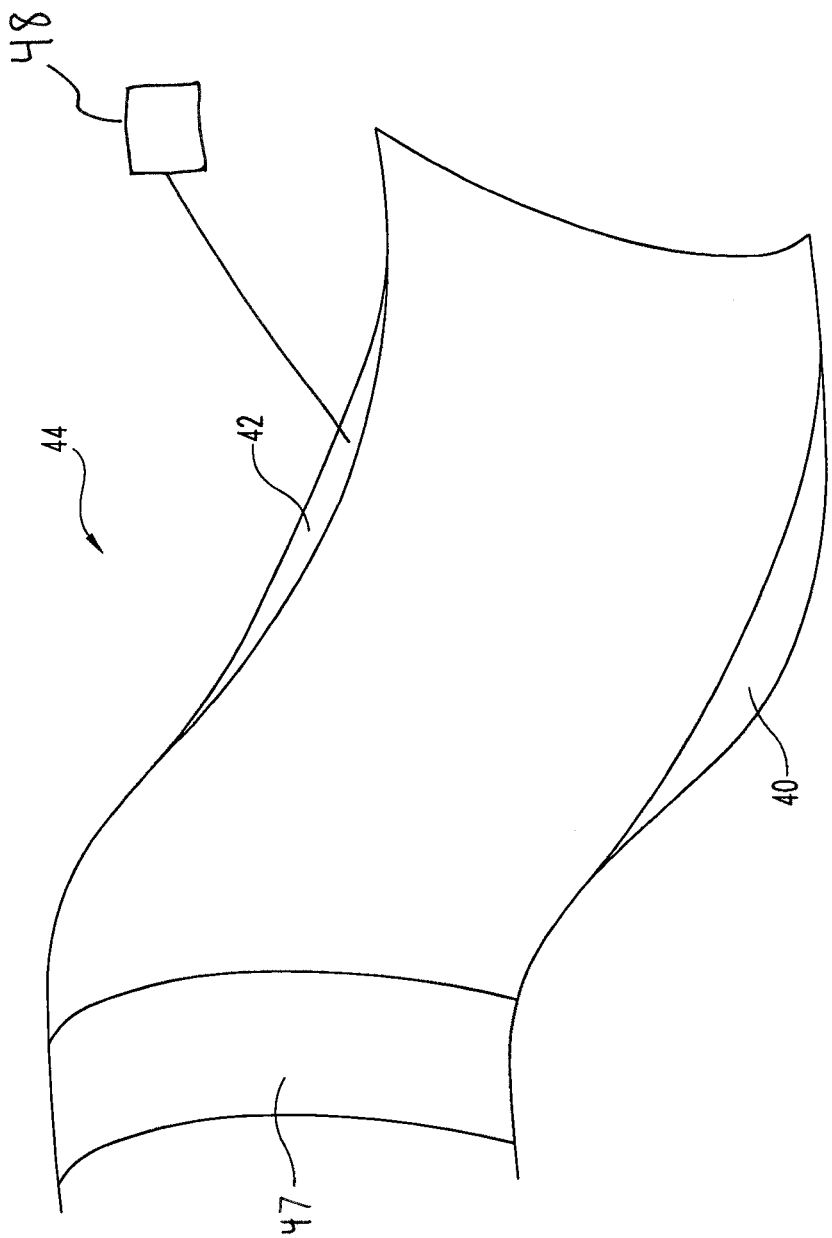
FIG. 8 is a side view of an s-shaped duct.

With reference to FIG. 8, there is schematically illustrated the application of non-axisymmetric flow members 40 and 42 to S-shaped duct 44. Flow members 40 and 42 are substantially identical to the flow members 25. Non-axisymmetric flow member 40 is disposed on the hub side of S-shaped duct 44 and is oriented downstream from vane 47. In similar fashion, non-axisymmetric member 42 is disposed on the tip side of S-shaped duct 44 and is oriented downstream of vane 47. The geometry of non-axisymmetric flow members 40 and 42 causes the structure to smoothly blend back into the flow path where the flow turns back to the axial direction.

Non-axisymmetric flow members 40 and 42 generate a blockage in the flow region where the wake fluid from vane 47 would normally occupy in an axisymmetric S-shaped duct. The blockage associated with non-axisymmetric flow members 40 and 42 prevents the wake fluid from diffusing at the same rate as the core working fluid thereby delaying or preventing flow separation. FIG. 8 also illustrates flow member 42 coupled with an actuator 48 capable of positioning the flow member 42.

Figure 9:
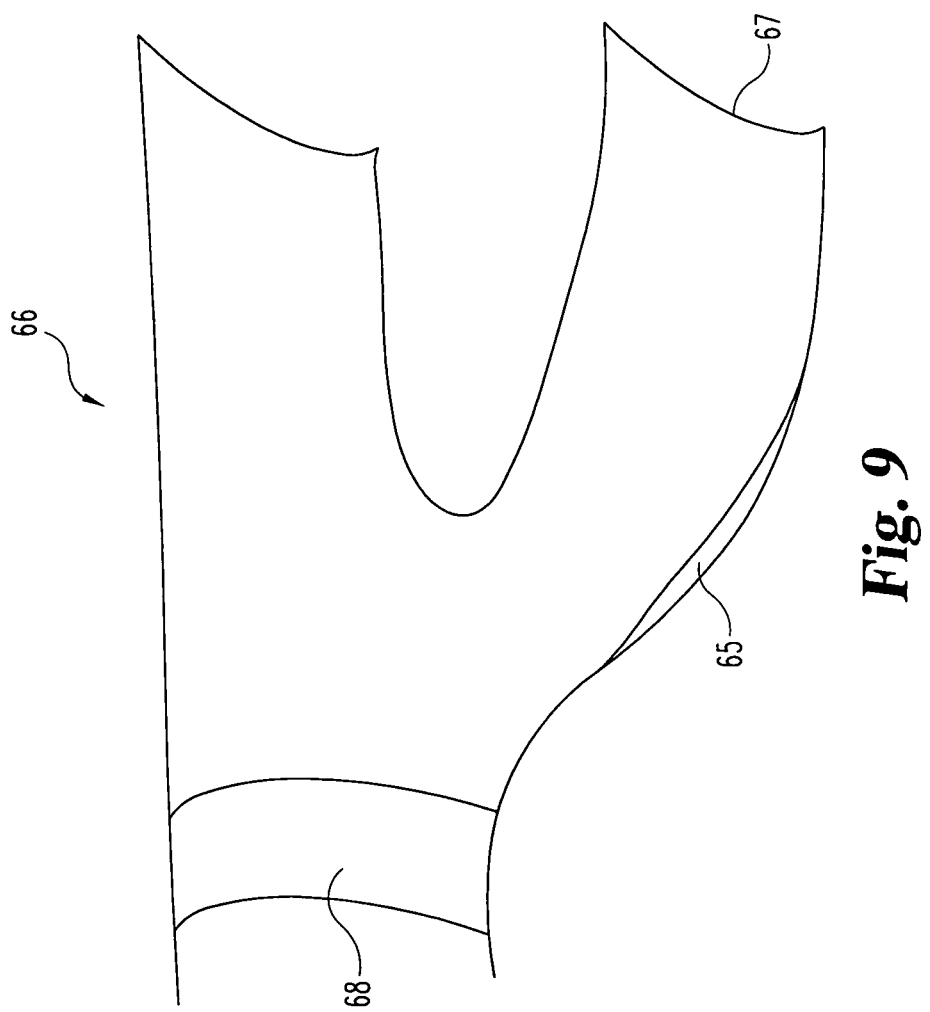
FIG. 9 is a side view of another duct.

With reference to FIG. 9, there is schematically illustrated the application of non-axisymmetric flow member 65 to bifurcated duct 66. Non-axisymmetric flow member 65 is disposed on the hub side of core flow path 67 and is oriented downstream from vane 68. The geometry of non-axisymmetric flow member 65 causes the structure to smoothly blend back into the flow path where the flow turns back to the axial direction.

Many other embodiments of the present application are envisioned. For example, non-axisymmetric flow members can be disposed within any duct downstream of an outlet guide vane, stator, strut or other structure. A number of potential locations exist where non-axisymmetric flow members may be located. In particular, non-axisymmetric flow members may reside in an s-shaped duct downstream of a turbine or can reside in a bifurcated duct downstream of the fan stage of the turbofan engine. Furthermore, a non-axisymmetric flow member may reside downstream of each vane member or, alternatively, may reside downstream of only a select number of vane members. In addition, each vane may have a protrusion on each of the upper and lower walls that define the ends of the vane.

In further embodiments, the non-axisymmetric flow members may be disposed on a rotor downstream of compressor blades. In this way non-axisymmetric flow members rotate with rotor blades.

In still further embodiments, the non-axisymmetric flow members may be placed in a flow path downstream of a centrifugal compressor.

In other embodiments, certain non-axisymmetric flow members disposed within the duct may be actuated to extend or retract while others remain passive during the entire operation of a gas turbine engine. Some non-axisymmetric flow members may have a larger peak bump distance than others. Still others may have different locations of peak bump distance relative to the leading or trailing edge of the non-axisymmetric flow members. Still other non-axisymmetric flow members disposed within a duct may have varying shapes and sizes.

In still other embodiments, a gas turbine engine is provided comprising an inner wall member, an outer wall member spaced from the inner wall to define a fluid flowpath, a compressor including a guide vane stage located upstream from the fluid flowpath, the guide vane stage including a plurality of vanes positioned around a portion of the fluid flowpath, and a plurality of elongated protrusions located downstream of the guide vane stage and extending into the fluid flowpath.

In a further embodiment, an apparatus is provided comprising a fluid flowpath, a compressor stage located upstream from the fluid flow path, a plurality of guide vanes positioned circumferentially around a portion of the fluid flowpath, and a plurality of restrictors located in the fluid flowpath for preventing separated flow downstream of the guide vanes.

In still another embodiment, an apparatus is provided comprising a gas turbine engine having a duct configured to support a fluid flow, a vane disposed within the duct, and means for altering the diffusion of the fluid flow downstream of the vane.

In still a further embodiment, a method is provided comprising rotating a rotatable stage of a compressor to increase the pressure of a working fluid, flowing the working fluid through an outlet guide vane stage and into a fluid flow passageway, and controlling the diffusion rate in the fluid flow passageway after said flowing.

In still a further embodiment, the diffusion rate can be controlled by extending at least one elongate protrusion into the flowpath axially downstream of the outlet guide vane stage. The diffusion rate can also be controlled by actuating fewer than all of the protrusions. The diffusion rate can also be controlled by changing the diffusion rate of the fluid flow after the vane from that of the core flow in the duct.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus for use in a gas turbine engine comprising:
   an inner wall member;
   an outer wall member spaced from the inner wall member to define a fluid flowpath;
   a compressor including a guide vane stage located upstream from the fluid flowpath, the guide vane stage including a plurality of vanes positioned around a portion of the fluid flowpath; and
   a plurality of elongated protrusions located downstream of the guide vane stage and extending into the fluid flowpath.

2. The apparatus of claim 1 wherein the fluid flowpath is either s-shaped or bifurcated.

3. The apparatus of claim 1, wherein the plurality of elongated protrusions extend into the fluid flowpath up to about 30% of the distance between the inner wall and the outer wall.

4. The apparatus of claim 1, wherein the inner wall member includes an inner wall diffusion, the outer wall includes an outer wall diffusion, and the plurality of elongated protrusions is formed in the wall having the higher diffusion.

5. The apparatus of claim 1, wherein at least one of the plurality of protrusions is located downstream of each of the plurality of vanes.

6. The apparatus of claim 1, wherein one of the plurality of protrusions is located on each of the inner wall and outer wall downstream of each of the plurality of vanes.

7. The apparatus of claim 1, wherein at least one of the plurality of elongated protrusions is operatively connected to an actuator.

8. The apparatus of claim 1, wherein at least one of the plurality of elongated protrusions is passive.

9. An apparatus comprising:
   a fluid flowpath;
   a compression stage located upstream from the fluid flow path;
   a plurality of guide vanes positioned circumferentially around a portion of the fluid flowpath; and
   a plurality of restrictors located in the fluid flowpath for preventing separated flow downstream of the guide vanes.

10. The apparatus of claim 9, wherein the compression stage is a compressor.

11. The apparatus of claim 9, wherein the compression stage is a fan.

12. The apparatus of claim 9, wherein the restrictors are disposed on a rotor.

13. The apparatus of claim 9, wherein the plurality of restrictors extend into the flowpath.

14. The apparatus of claim 9, wherein each of the plurality of restrictors is elongate in shape.

15. The apparatus of claim 14, wherein the elongate shape has a length to width ratio of 3:1.

16. A method comprising:
   rotating a rotatable stage of a compressor to increase the pressure of a working fluid;

flowing the working fluid through an outlet guide vane stage into a fluid flow passageway;

encountering a protrusion that includes a first circumferential lateral side, a second circumferential lateral side, and an intermediate portion higher than the first circumferential lateral side and the second circumferential lateral side; and controlling the diffusion in the fluid flow passageway as a result of said encountering.

17. The method of claim 16, wherein in the encountering includes a plurality of protrusions extending into the flowpath downstream of the outlet guide vane stage.

18. The method of claim 17, wherein the controlling includes actuating at least one of the plurality of protrusions.

19. The method of claim 16, wherein the controlling includes changing the diffusion of the fluid flow after the outlet guide vane from that of the core flow in the duct.

* * * * *